United States Patent Office 3,312,641
Patented Apr. 4, 1967

3,312,641
POLYVINYL ALCOHOL PLASTICIZED AMYLOSE COMPOSITIONS
Austin H. Young, Decatur, Ill., assignor to A. E. Staley Manufacturing Company, Decatur, Ill., a corporation of Delaware
No Drawing. Filed June 19, 1963, Ser. No. 288,869
15 Claims. (Cl. 260—17.4)

This invention relates to amylose packaging films plasticized with polyvinyl alcohol.

For years amylose films have been studied from a more or less academic point of view since amylose was not commercially available. Now that amylose has become available in sizeable quantities research on amylose films has increased. One of the major problems, which has slowed the commercialization of amylose films, is that the flexibility and elongation of amylose films is dependent upon the water content of the amylose film. At low relative humidity, water is lost by evaporation, and the film becomes extremely brittle and its percent elongation decreases. Until now no adequate plasticizer or combination of plasticizers has been found for amylose, which function at low relative humidity.

Various attempts to find plasticizers for amylose have centered upon humectants, which would retain water at low relative humidity. Glycerol has generally been considered the best amylose plasticizer. However, glycerol is sadly deficient. At low relative humidity, amylose films plasticized with glycerol have about the same elastic modulus and percent elongation as unplasticized amylose films. At about 50% relative humidity, the glycerol-plasticized amylose film has an initial percent elongation and elastic modulus better than those of unplasticized amylose. However, with this increase in percent elongation and/or decrease in elastic modulus, there is a marked decrease in tensile strength and a drop in tear strength. Further, the improvements imparted by humectants such as glycerol are only temporary. After aging, the elastic modulus and percent elongation of amylose films plasticized with glycerol revert to levels that are not appreciably better than those of unplasticized film.

The object of this invention is to provide an improved plasticizer for amylose films.

I have now found that polyvinyl alcohol is a unique amylose plasticizer. The addition of polyvinyl alcohol to amylose films results in an increase in the percent elongation of amylosic films. Unlike other amylose plasticizers this increase in percent elongation is not at the sacrifice of the film's tear strength or tensile strength. The tensile strength is approximately the same as the tensile strength of an unplasticized film while the tear strength of the film is increased. Further, the percent elongation of the amylose film is relatively independent of humidity conditions and the age of the film. Preferably less than about 20 mole percent of the monomeric units in the ployvinyl alcohol contain acetyl groups. The higher the concentration of acetyl groups, the poorer the compatibility of the polyvinyl alcohol in the amylose.

For the purpose of this invention, the term "amylosic material" refers to the amylose resulting from the separation of the amylose and amylopectin components of starch, or the whole starch which is composed of at least 50% amylose. Commercially available sources of amylosic material include "Nepol" amylose (the amylose fraction of corn starch), "Superlose" (the amylose fraction of potato starch), "Amylomaize" or "Amylon" (high-amylose corn starch containing approximately 54% amylose), "Amylose), "Amylon VII" (high-amylose corn starch containing up to 70% amylose), etc. The amylose films based on high-amylose corn starch can be simulated by mixing corresponding concentrations of separated amylose with separated amylopectin. Preferably, the amylopectin content of the amylosic material is less than 20% by weight since the higher the concentration of amylose the better the tensile strength of the film. Various derivatives of amylose (amylose acetate, hydroxyethyl amylose) such as those described in British Specification 871,634, published June 28, 1961, can also be employed.

The polyvinyl alcohol must be used in a concentration of at least 5 parts by weight for each 95 parts by weight (d.s.b.) amylose. Below this level polyvinyl alcohol is ineffective as the sole amylose film plasticizer. Best results at the lowest cost have been obtained using compositions comprising from 10 to 30 parts by weight polyvinyl alcohol and corresponding from 90 to 70 parts by weight amylose. If desired, still higher concentrations of polyvinyl alcohol can be used without the amylose film becoming incompatible. For example, clear films have been cast from compositions over the whole range of from 5 to 90 parts by weight polyvinyl alcohol and correspondingly 95 to 10 parts by weight amylose.

The amylose films can be prepared by any of the prior art techniques, such as those described in any of U.S. Patents 2,608,723 to Wolff et al., 2,903,336 to Hiemstra et al., 2,973,243 to Kudera, 3,030,667 to Kunz, etc. In utilizing these processes, the polyvinyl alcohol plasticizer (in either the dry form or dissolved in solvent, such as water) is added to a suitable solution of amylose (in water at pH 7, in aqueous alkali, in aqueous formaldehyde, in dimethyl sulfoxide, etc.). The amylose solution is then cast on a suitable substrate, such as a belt, or extruded through a suitable orifice into a coagulating (acidic or salt) bath. In this way the amylose is recovered in the form of a film from the aqueous solution by evaporation of the solvent or by the precipitation of the amylose film.

These techniques can be employed to prepare self-supporting films, which are large in two dimensions and small in the third dimension. The previously prepared films can also be laminated to a suitable base.

The amylose film can also be prepared by extruding superficially dry amylose and polyvinyl alcohol. This extrusion technique is described in detail in commonly assigned application Ser. No. 244,127, filed Dec. 12, 1962.

The following examples are merely illustrative and are not to be construed as limiting the scope of my invention. All of the data in the examples is an average of five determinations.

EXAMPLE I

An aqueous solution of defatted corn amylose was prepared by passing an aqueous slurry of 8 grams defatted corn amylose (d.s.b.) in 72 grams of water through a 35 foot long coil heated to 150° C. having an inside diameter of ⅛", an outside diameter of ¼", and a 2 minute dwell time. The aqueous solution was cooled to 95° C. and placed in a preheated Dewar flask, which contained 2 grams of polyvinyl alcohol (less than 2% acetyl) dissolved in 48 grams water (95° C.). The solution was stirred for 60 seconds and then cast upon a lecithin-coated glass plate at 30° C. using a 20 mil doctor blade preheated to 95° C. The film gelled rapidly at room temperature. The same technique was employed for preparing an amylose film having no plasticizer and one containing 2 grams glycerol and 8 grams amylose. Each film was stripped from its glass plate. After the films were aged for one week at 23° C. at either 50% relative humidity or 23% relative humidity, the films were tested for tensile strength, percent elongation and tear strength. The results are set forth below in Table I.

TABLE I

| Plasticizer | Film Thickness in Mils | At Relative Humidity | | | | | |
|---|---|---|---|---|---|---|---|
| | | 50% | 23% | 50% | 23% | 50% | 23% |
| | | Tensile Strength in p.s.i. | | Percent Elongation | | Tear Strength in Pounds | |
| None | 0.8 | 9,020 | 13,200 | 5 | 8 | 0.94 | 0.93 |
| Glycerol | 0.9 | 3,240 | 8,980 | 12 | 6 | 0.74 | 0.97 |
| Polyvinyl Alcohol | 1.0 | 8,500 | 14,760 | 13 | 12 | 1.72 | 2.09 |

The above table illustrates that polyvinyl alcohol is an extremely efficient plasticizer for amylose films, which increases the tear strength and percent elongation of amylose films without noticeably decreasing the tensile strength. It also illustrates that glycerol, which is normally considered the best amylose plasticizer is ineffective at low relative humidity.

EXAMPEL II

This example illustrates the effect of aging on amylose films. The films were prepared in the manner described in Example I and then aged at 50% relative humidity and 23° C. The results are set forth below in Table II.

TABLE II

| Plasticizer | Film Thickness in mils | Age of film in weeks | | | |
|---|---|---|---|---|---|
| | | 1 | 8 | 1 | 8 |
| | | Tensile Strength in p.s.i. | | Percent Elongation | |
| None | 0.8 to 1 | 9,020 | 8,120 | 5 | 6 |
| Glycerol | 0.9 to 1 | 3,240 | 4,860 | 12 | 9 |
| Polyvinyl Alcohol | 1.0 | 8,510 | 7,990 | 13 | 15 |

The above table illustrates that the plasticizing effect of polyvinyl alcohol is independent of the age of the amylose film, while the plasticizing effect of glycerol decreases as the amylose film ages.

EXAMPLE III

This example illustrates the plasticizing effect of polyvinyl alcohol wherein the amylose films contain 5.5% by weight polyvinyl alcohol and 9.5% by weight polyvinyl alcohol. The amylose films were prepared in the manner described in Example I. The results are set forth below in Table III.

TABLE III

| Percent Weight Polyvinyl Alcohol | Film Thickness in mils | At Relative Humidity | | | |
|---|---|---|---|---|---|
| | | 50% | 23% | 50% | 23% |
| | | Tensile Strength in p.s.i. | | Percent Elongation | |
| 0 | 1.4 | 8,670 | 13,000 | 6 | 5 |
| 5.5 | 1.3 | 8,520 | 13,920 | 7 | 7 |
| 9.5 | 1.6 | 8,110 | 13,500 | 12 | 8 |

EXAMPLE IV

A series of amylose (Elvanol 72–60) polyvinyl alcohol films were prepared in the manner described in Example I. The results are set forth below in Table IV.

TABLE IV

| Percent Weight Polyvinyl Alcohol | At Relative Humidity | | | | | |
|---|---|---|---|---|---|---|
| | 50% | 20% | 50% | 20% | 50% | 20% |
| | Tensile Strength in p.s.i. | | Percent Elongation | | Tear Strength in pounds/mil. | |
| 20 | 8,120 | 12,800 | 6 | 12 | 1.51 | 2.21 |
| 30 | 7,750 | 13,100 | 8 | 9 | 1.62 | 2.35 |
| 40 | 7,290 | 12,600 | 12 | 14 | 2.05 | 2.63 |
| 50 | 6,830 | 12,900 | 32 | 22 | 1.97 | 2.81 |
| 60 | 6,440 | 11,400 | 23 | 18 | 2.00 | 2.81 |
| 70 | 6,880 | 12,400 | 77 | 39 | 1.98 | 3.09 |
| 80 | 6,820 | 10,600 | 49 | 22 | 1.88 | 2.21 |
| 90 | 6,240 | 10,600 | 110 | 13 | 1.53 | 2.12 |

The above data illustrates that polyvinyl alcohol is compatible with amylose in virtually all proportions. This is particularly surprising since the trade literature on the ELAVNOLS and on the VINOLS indicate that aqueous mixtures of pasted corn starch and polyvinyl alcohol are only compatible when the polyvinyl alcohol comprises either less than 10% of the dry solids or more than 80% of the dry solids. The trade literature of the VINOLS also indicates that this same incompatibility is also found in applied coatings of corn starch and polyvinyl alcohol.

EXAMPLE V

This example illustrates the dry extrusion of an amylose-polyvinyl alcohol film. Four hundred parts by weight of corn amylose (376 parts by weight dry solids basis) and 100 parts polyvinyl alcohol (Elvanol 72–60) were mixed together for 15 minutes in a Hobart mixture. Two hundred and fifty parts by weight of water was gradually added to the mixture. The white powder was fed continuously under slight pressure to a conventional screw-type plastic extruder. The screw was 12 inches long, 1 inch in diameter and had a compression ratio of 1.56 to 1. The work done on the amylose mixture by the screw, which was rotated at 60 r.p.m., developed enough heat to convert the mixture into a fluid mass and raised its temperature to about 160° C. The fluid reaction mass, cooled to 135° C., was forced through a 15 mil opening in a sheeting die, which was slowly closed to 3 mils. Immediately after the extrusion the film having a thickness of 5 mils could be stretched 200%. On aging the film was extremely tough.

Since many embodiments of this invention may be made and since many changes may be made in the embodiments described, the foregoing is to be construed as illustrative only and my invention is defined by the claims appended hereafter.

I claim:
1. A plasticized amylose film comprising an amylose portion having more than 50% by weight amylose and a polyvinyl alcohol portion containing at least 5 parts by weight polyvinyl alcohol per 95 parts by weight of said amylose portion, said amylose portion containing an amylosic material selected from the group consisting of the amylose fraction of starch and whole starch containing at least 50% by weight amylose.

2. The article of claim 1 wherein said amylosic material is underivatized.

3. The article of claim 1 wherein said amylosic material contains no more than 20% by weight amylopectin.

4. The article of claim 3 wherein said amylosic material is the separated amylose fraction of whole starch.

5. A self-supporting, continuous, plasticized amylose film comprising an amylose portion having more than 50% by weight amylose and a polyvinyl alcohol portion containing at least 5 parts by weight polyvinyl alcohol per 95 parts by weight of said amylose portion, said amylose portion containing an amylosic material selected from the group consisting of the amylose fraction of starch and whole starch containing at least 50% by weight amylose.

6. A continuous plasticized amylose packaging film wherein said film comprises from about 10 to 30 parts by weight of a polyvinyl alcohol portion and correspondingly 90 to 70 parts by weight of an amylose portion having more than 50% by weight amylose, said amylose portion containing an amylosic material selected from the group consisting of the amylose fraction of starch and whole starch containing at least 50% by weight amylose.

7. The amylose film of claim 6 wherein said amylosic material is underivatized.

8. The amylose film of claim 7 wherein said amylosic material contains no more than 20% amylopectin.

9. The amylose film of claim 8 wherein said amylosic material is the separated amylose fraction of whole starch.

10. A composition comprising from 5 to 90 parts by weight of a polyvinyl alcohol portion and correspondingly from 95 to 10 parts by weight of an amylose portion having more than 50% by weight amylose, said amylose portion containing an amylosic material selected from the group consisting of the amylose fraction of starch and whole starch containing at least 50% by weight amylose.

11. The composition of claim 10 wherein said amylosic material is underivatized.

12. The composition of claim 10 wherein said amylosic material contains no more than 20% amylopectin.

13. The composition of claim 12 wherein said amylosic material is the separated amylose fraction of whole starch.

14. A composition comprising from 5 to 30 parts by weight of a polyvinyl alcohol portion and correspondingly from 95 to 70 parts by weight of an amylose portion having more than 50% by weight amylose, said amylose portion containing an amylosic material selected from the group consisting of the amylose fraction of starch and whole starch containing at least 50% by weight amylose.

15. The composition of claim 14 wherein the amylosic material is the underivatized separated amylose fraction of starch containing no more than 20% by weight amylopectin.

References Cited by the Examiner

UNITED STATES PATENTS

| | | | |
|---|---|---|---|
| 2,406,905 | 3/1946 | Rothrock | 260—9 |
| 2,656,571 | 10/1953 | Davis et al. | 264—217 |
| 3,067,067 | 12/1962 | Etheridge et al. | 260—233.3 |
| 3,133,890 | 5/1964 | Britton | 260—17.4 |

FOREIGN PATENTS

| | | |
|---|---|---|
| 1,225,463 | 2/1960 | France. |
| 770,089 | 3/1957 | Great Britain. |
| 847,431 | 4/1960 | Great Britain. |

OTHER REFERENCES

Elvanol PVA, E. I. du Pont & Co., Inc., 1947, Wilmington, Delaware. Pages 7, 17–19 and 33.

WILLIAM H. SHORT, *Primary Examiner.*

E. M. WOODBERRY, *Assistant Examiner.*